(12) United States Patent
Watanabe et al.

(10) Patent No.: US 10,747,200 B2
(45) Date of Patent: Aug. 18, 2020

(54) ROBOT CONTROL PROGRAM GENERATION METHOD AND APPARATUS

(71) Applicant: KAWASAKI JUKOGYO KABUSHIKI KAISHA, Kobe-shi, Hyogo (JP)

(72) Inventors: Masayuki Watanabe, Kobe (JP); Katsushi Kitaarashi, Takarazuka (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 15/500,358

(22) PCT Filed: Jul. 22, 2015

(86) PCT No.: PCT/JP2015/070843
§ 371 (c)(1),
(2) Date: Jan. 30, 2017

(87) PCT Pub. No.: WO2016/017501
PCT Pub. Date: Feb. 4, 2016

(65) Prior Publication Data
US 2017/0220024 A1    Aug. 3, 2017

(30) Foreign Application Priority Data
Jul. 30, 2014    (JP) ................. 2014-154961

(51) Int. Cl.
*G05B 19/409*    (2006.01)
*B23P 21/00*    (2006.01)
(Continued)

(52) U.S. Cl.
CPC ............ *G05B 19/409* (2013.01); *B23P 19/04* (2013.01); *B23P 21/00* (2013.01); *B25J 9/1669* (2013.01);
(Continued)

(58) Field of Classification Search
CPC ............ G05B 19/409; G05B 19/40937; G05B 19/0426; G05B 13/041; G05B 2219/40397; B23P 21/00; B25J 9/1671
(Continued)

(56) References Cited

U.S. PATENT DOCUMENTS 5,796,986 A    8/1998   Fuller
6,201,996 B1 *   3/2001   Crater ................ G05B 19/0421
                                                700/69
(Continued)

FOREIGN PATENT DOCUMENTS

JP    H10-124130 A    5/1998
JP    H10-263957 A    10/1998
(Continued)

OTHER PUBLICATIONS

Sep. 8, 2015 International Search Report issued in International Patent Application No. PCT/JP2015/070843.
Mar. 5, 2018 Extended European Search Report issued in European Application No. 15827126.2.

* cited by examiner

*Primary Examiner* — Ziaul Karim
(74) *Attorney, Agent, or Firm* — Oliff PLC (57) ABSTRACT

This method includes a step for the extraction of robot control program creation data from an animation program displaying an assembly sequence for the manufacturing of an assembled product with a plurality of parts, a step for the addition of predetermined robot control data to the robot control program creation data, and a step for the creation of a robot control program relating to the assembly operations of the assembled product using the robot control program creation data and the predetermined robot control data. A robot control program for manufacturing an assembled product with a plurality of parts can be easily generated.

12 Claims, 8 Drawing Sheets

(51) Int. Cl.
*B23P 19/04* (2006.01)
*B25J 9/16* (2006.01)
*G05B 13/04* (2006.01)
*G05B 19/042* (2006.01)
*G05B 19/4093* (2006.01)

(52) U.S. Cl.
CPC .......... *B25J 9/1671* (2013.01); *G05B 13/041* (2013.01); *G05B 19/0426* (2013.01); *G05B 19/40937* (2013.01); *G05B 2219/36231* (2013.01); *G05B 2219/40397* (2013.01); *G05B 2219/45064* (2013.01)

(58) Field of Classification Search
USPC ........................................................ 700/180
See application file for complete search history.

(56) References Cited

U.S. PATENT DOCUMENTS

| | | |
|---|---|---|
| 8,027,745 B1 | 9/2011 | Freeze |
| 2004/0015079 A1* | 1/2004 | Berger .................. A61B 8/546 |
| | | 600/437 |
| 2005/0149231 A1 | 7/2005 | Pretlove et al. |
| 2016/0284232 A1* | 9/2016 | Sisamos ............. G05B 19/0426 |

FOREIGN PATENT DOCUMENTS

| | | |
|---|---|---|
| JP | 2001-353631 A | 12/2001 |
| JP | 2002-355724 A | 12/2002 |
| JP | 2004-237364 A | 8/2004 |
| JP | 2006-350620 A | 12/2006 |

FIG. 1

| Item | Contents |
|---|---|
| Product information output | A file is outputted so that the product information saved in the animation program is compatible with the OLP<br>• Product information output<br>  – Assembly configuration<br>  – Product position/attitude of parts/assembly<br>  – Shapefile name<br>  – Other attributes<br>• Shape output<br>  – File outputted for each part |
| Trajectory information output | A file is outputted so that the product assembly sequence and assembly animation are compatible with the OLP<br>• Animated initial position and attitude information<br>• Animated trajectory information |

FIG. 2

| Product information | |
|---|---|
| Item | Description |
| Level | Level of assembly configuration |
| | Assembly configuration can be reproduced from this item |
| ID for external editing | A character string for the identification of components (parts, assemblies) |
| | Used as an identifier for cooperation with the OLP |
| Classification | Classification of components |
| | "Parts, assemblies, processes" are identified from this item |
| Part number | The part number for a component |
| X-coordinate (space) | The X-coordinate of a position (coordinate system) |
| Y-coordinate (space) | The Y-coordinate of a position (coordinate system) |
| Z-coordinate (space) | The Z-coordinate of a position (coordinate system) |
| Attitude matrix | The matrix of an attitude (coordinate system) |
| Shapefile name | Shapefile name |
| | When this item is defined, a file is outputted for each part, and a file name is outputted in the CSV file |
| | The file name for each part is outputted as the very last item in the CSV file |

FIG. 3

Product information output example

"Tree level","ID for external edit","Class","Part Number","Name","Coordinate X (Global)","Coordinate Y (Global)","Coordinate Z (Global)","Attitude","Shape File","Stl File"
"1","1Vnlu8_0","Parts","P011","","95","95","0","1 0 0 0 1 0 0 0 1","P011.slb","P011.stl"
"2","1Vnlu8_1","Parts","P021","","0","150","-30","1 0 0 0 -1 0 0 0 -1","P021.slb","P021.stl"
"2","1Vnlu8_2","Parts","P022","","150","50","-80","1 0 0 0 0 -1 0 1 0","P022.slb","P022.stl"
"2","1Vnlu8_3","Parts","P023","","150","50","-280","1 0 0 0 0 -1 0 1 0","P023.slb","P023.stl"
"1","1Vnlu8_4","Assy","A012","","0","150","-30","1 0 0 0 -1 0 0 0 -1","A012.slb","A012.stl"
"1","1Vnlu8_5","Parts","P013","","180","415","0","1 0 0 0 1 0 0 0 1","P013.slb","P013.stl"
"1","1Vnlu8_6","Parts","P014","","20","95","0","1 0 0 0 0 -1 0 1 0","P014.slb","P014.stl"
"1","1Vnlu8_7","Parts","P015","","20","415","0","1 0 0 0 0 -1 0 1 0","P015.slb","P015.stl"
"1","1Vnlu8_8","Parts","P016","","0","55","-30","1 0 0 0 0 -1 0 1 0","P016.slb","P016.stl"
"1","1Vnlu8_9","Parts","P017","","0","150","-30","1 0 0 0 0 -1 0 1 0","P017.slb","P017.stl"
"1","1Vnlu8_10","Parts","P018","","180","95","0","1 0 0 0 0 -1 0 1 0","P018.slb","P018.stl"
"0","1Vnlu8_11","Assy","A001","","0","55","0","1 0 0 0 1 0 0 0 1","A001.slb","A001.stl"

FIG. 4

| Animated initial position and attitude information | |
|---|---|
| Item | Description |
| ID for external editing | A character string for the identification of components (parts/assemblies) |
| Initial position coordinates | The coordinates (coordinate system) of the initial position of the components (parts/assemblies) at the start of the animation<br>For a component to which a subject robot is not set, the product position will be its initial position |
| Initial attitude matrix | The initial attitude matrix (coordinate system) at the start of the animation<br>For a component to which a subject robot is not set, the product attitude will be its initial attitude |
| Subject robot name | A character string naming the robot subject to operations (robot is assigned a name in the extension row)<br>The name of the extension row is specified in the INI file |
| Teaching point position coordinates | The coordinates of the position of instruments set to the subject components (local coordinate system)<br>An instrument not set to a subject component will appear in its initial position |
| Teaching point attitude matrix | The attitude matrix of the instruments set to the subject components (local coordinate system)<br>An instrument not set to a subject component is not rotatable |
| Component part number | The part number for part/assembly |
| Instrument name | The name of an instrument set to a component<br>The name of an instrument not set to a component will appear blank |
| Arbitrary extension row | An arbitrary extension value can be outputted (multiple ones can be specified)<br>The name of the extension to be outputted is specified in the INI file |

FIG. 5

Initial position information output example

< InitPositionInfo >
"ID for external edit","Part Coordinate","Part Attitude","Robot","Point Coordinate","Point Attitude","Part Number","Tool"
"1Vnlu8_1","0 150 -30","1 0 0 0 -1 0 0 0 -1","Robot1","","","P021",""
"1Vnlu8_2","150 50 -80","1 0 0 0 0 -1 0 1 0","Robot1","0 0 0","1 0 0 0 1 0 0 0 1","P022","Spanner"
"1Vnlu8_3","150 50 -280","1 0 0 0 0 -1 0 1 0","Robot2","10 90 -100","1 0 0 0 -1 0 0 0 -1","P023","Spanner"
"1Vnlu8_4","0 150 -30","1 0 0 0 -1 0 0 0 -1","","","","A012",""
< /InitPositionInfo >

FIG. 6

| Animated trajectory information | |
|---|---|
| Outputted information | Description |
| Order information | A serial number displaying the order of the animations The same number will be outputted for a parallel operation |
| ID for external editing | An identifier for compatibility with the OLP |
| Position coordinates after shift | The teaching point position coordinates (coordinate system) after the movement/rotation in the animation If an instrument is set, the instrument position will be outputted, if not, the initial position will be outputted. |
| Attitude matrix after shift | The teaching point attitude matrix (coordinate system) after the movement/rotation in the animation If an instrument is set, the instrument attitude will be outputted, if not, it will be outputted without rotation |
| Flow index | The number for the flow index set to the animation commands |
| Command order | The order of each animated command |
| (Arbitrary extension row) | An arbitrary extension row value can be outputted (multiple extensions can be specified) The name of the extension row to be outputted is specified in the INI file |

FIG. 7

Trajectory information output example

```
< MoveInfo >
"Order","ID for external edit","Coordinate","Attitude","Flow Index","Command Order"
"1","1Vnlu8_2","200 100 0","1 0 0 0 -1 0 1 0","1","1"
"2","1Vnlu8_2","10 50 10","1 0 0 0 -1 0 1 0","2","1"
"2","1Vnlu8_3","0 0 0","1 0 0 0 1 0 0 0 1","2","1"
< /MoveInfo >
```

FIG. 8

ROBOT CONTROL PROGRAM GENERATION METHOD AND APPARATUS

TECHNICAL FIELD

The present invention relates to a method and an apparatus for generating a robot control program for manufacture an assembled product by assembling a plurality of parts.

BACKGROUND ART

Manual labor by operators is being increasingly replaced by the automated labor of robots for assembling a plurality of parts so as to manufacture an assembled product (product). In recent years, the automation of assembly operations by use of robots has increased with the goal of minimizing personnel expenses.

Incidentally, in order to assign a robot the task of assembling a plurality of parts so as to manufacture an assembled product, the robot must be taught the assembly operations in advance through the use of a teaching pendant or through offline teaching using a robot simulator, etc. (Patent Literature 1).

RELATED ART LITERATURE

Patent Literature

Patent Literature 1: JP 2001-353631 A

SUMMARY OF THE INVENTION

Problems to be Solved by the Invention

However, electronics, for instance, are composed of a large number of parts to be assembled, and the more parts the robot is subject to handle, the heavier the workload will be to teach the robot. In addition, if assembly operations are modified due to design alterations in an assembled product, the robot must be retaught the operations every time, which creates an excessive workload.

The present invention was created with consideration of the above-mentioned problems in the related art and with the goal of providing a method and an apparatus for easily generating a robot control program for the use of robots to manufacture an assembled product by assembling a plurality of parts.

Means for Solving the Problems in order to solve the above-mentioned problems, according to a first aspect of the present invention, a robot control program generation method includes: a data extraction process of extracting a robot control program creation data from a data of an animation program displaying an assembly sequence for manufacturing an assembled product by assembling a plurality of parts; and a data addition step of adding a predetermined robot control data to the robot control program creation data extracted in the data extraction step; and a program creation step of creating a robot control program relating to an assembly operation of the assembled product, using the robot control program creation data extracted in the data extraction step, and the predetermined robot control data added in the data addition step.

A second aspect of the present invention is that, in the invention according to the first aspect, the robot control program creation data which is extracted in the data extraction step includes at least a product information relating to the assembled product, and a trajectory information relating to a trajectory of the plurality of parts at a time of assembly.

A third aspect of the present invention is that, in the invention according to the second aspect, the trajectory information includes at least an animation initial position and attitude information relating to an initial position and an attitude of each of the plurality of parts, and an animation trajectory information relating to the trajectory of each of the plurality of parts from the initial position.

A fourth aspect of the present invention is that, in the invention according to any one of the first aspect to the third aspect, the robot control program is created using a robot simulator in the program creation step.

According to a fifth aspect of the present invention, a robot control program generation apparatus includes: a data extraction unit configured to extract a robot control program creation data from a data of an animation program displaying an assembly sequence for manufacturing an assembled product by assembling a plurality of parts; and a data addition unit configured to add a predetermined robot control data to the robot control program creation data extracted by the data extraction unit; and a program creation unit configured to create a robot control program relating to an assembly operation of the assembled product, using the robot control program creation data extracted by the data extraction unit, and the predetermined robot control data added by the data addition unit.

A sixth aspect of the present invention is that, in the invention according to the fifth aspect, the robot control program creation data which is extracted by the data extraction unit includes at least an product information of the assembled product, and a trajectory information relating to a trajectory of the plurality of parts at a time of assembly.

A seventh aspect of the present invention is that, in the invention according to the sixth aspect, the trajectory information includes at least an animation initial position and attitude information relating to an initial position and an attitude of each of the plurality of parts, and an animation trajectory information relating to a trajectory of each of the plurality of parts from the initial position.

An eighth aspect of the present invention is that, in the invention according to the fifth through the seventh aspect, the program creation unit include a robot simulator.

A ninth aspect of the present invention is a robot control program generated by the robot control generation method according to the robot control program generation method according to any one of the first to the fourth aspect.

Advantageous Effect of the Invention

According to the present invention, there is provided a method and an apparatus for easily generating a robot control program to manufacture an assembled product by assembling a plurality of parts.

BRIEF DESCRIPTION OF DRAWINGS

FIG. 5 is an explanatory diagram explaining animated initial position and attitude information with the robot control program generation method in accordance with an embodiment of the present invention.

DESCRIPTION OF THE EMBODIMENTS

Hereunder, a robot control program generation method and apparatus, in accordance to an embodiment of the present invention, will be described with reference to the drawings.

Figure 1:
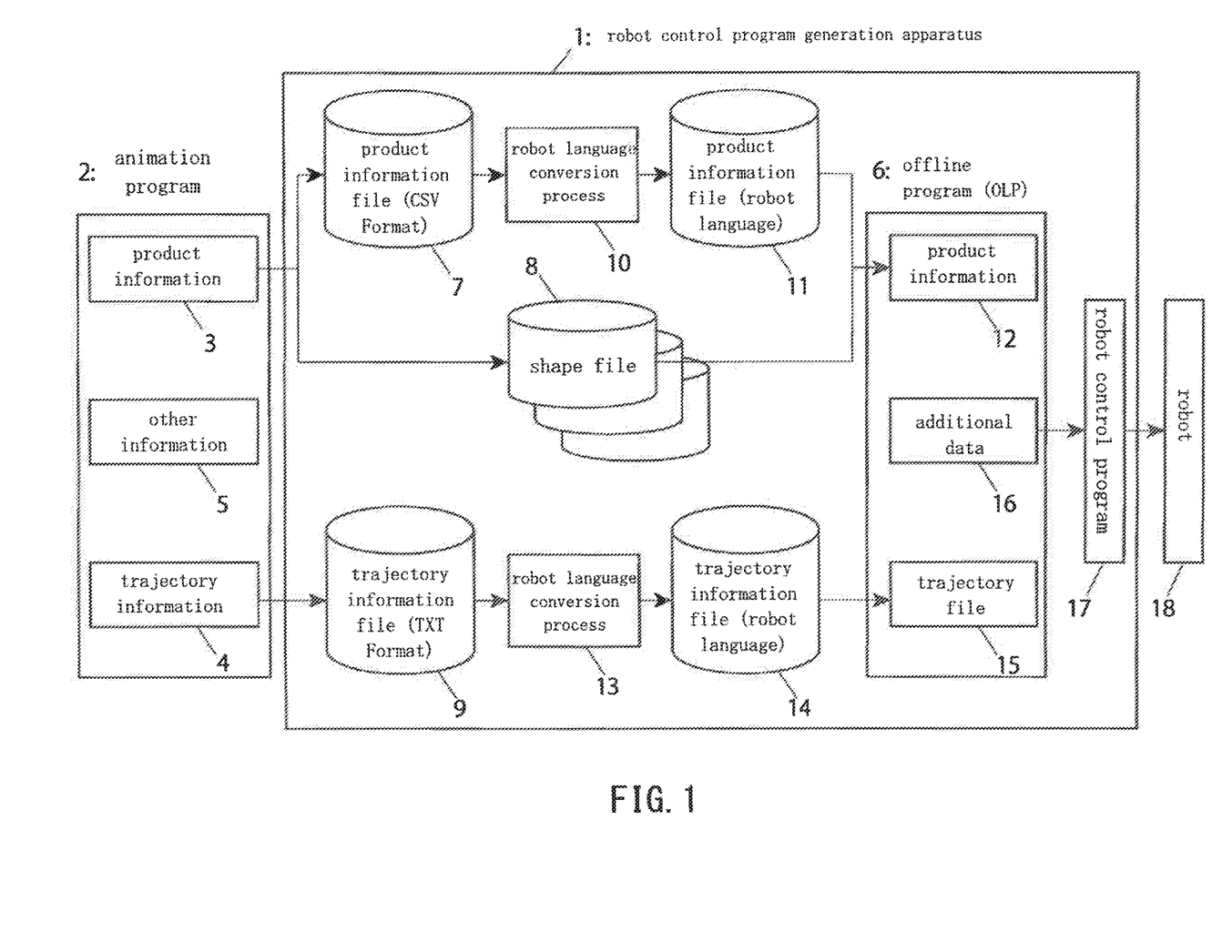
FIG. 1 is a schematic diagram illustrating a robot control program generation apparatus for the implementation of a robot control program generation method in accordance with an embodiment of the present invention.

FIG. 1 illustrates the schematic structure of a robot control program generation apparatus to implement the robot control program generation method in accordance with the present embodiment. This robot control program generation apparatus 1 can be implemented with a CPU (PC), for instance.

The animation program 2 in FIG. 1 plays an animation displaying the assembly sequence of a plurality of parts with the fastening of screws, the transportation of parts, etc. to manufacture an assembled product, such as electronics or the like. The animation is used to teach operators assembly sequences for product (assembled product).

The information in the animation program 2 includes product information 3 regarding the structure of the parts, etc., trajectory information 4 regarding the trajectory of a plurality of parts at the time of assembly, and other information 5.

In the robot control program generation method in accordance with the present embodiment, robot control program creation data is extracted from various animated data in the animation program 2 using data extraction unit of the robot control program generation apparatus 1 (data extraction process). In this data extraction process, at least the product information 3 and the trajectory information 4 are extracted.

Figure 2:
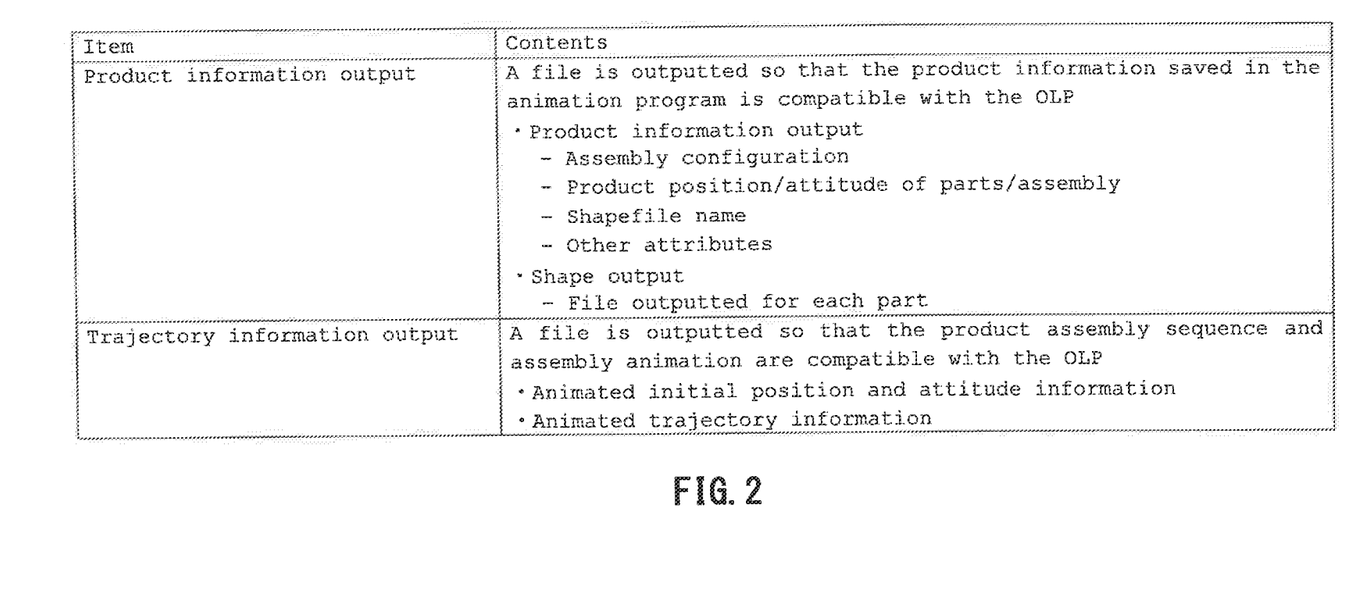
FIG. 2 is an explanatory diagram explaining the output of product information and trajectory information with the robot control program generation method in accordance with an embodiment of the present invention.

As illustrated in FIG. 2, in product information output, a product information file 7 and a shapefile 8 are outputted so that the product information 3 saved in the animation program 2 is compatible with the offline program (OLP) 6 for robots illustrated in FIG. 1. More specifically, assembly structure, product position/attitude of parts/assembly, shapefile name, and other attributes are outputted. A file is outputted for each part as shape output.

In trajectory information output, a trajectory information file 9 is outputted so that the product assembly order and assembly animation are compatible with the OLP 6. More specifically, files regarding animated initial position and attitude information and trajectory information are outputted.

Figure 3:
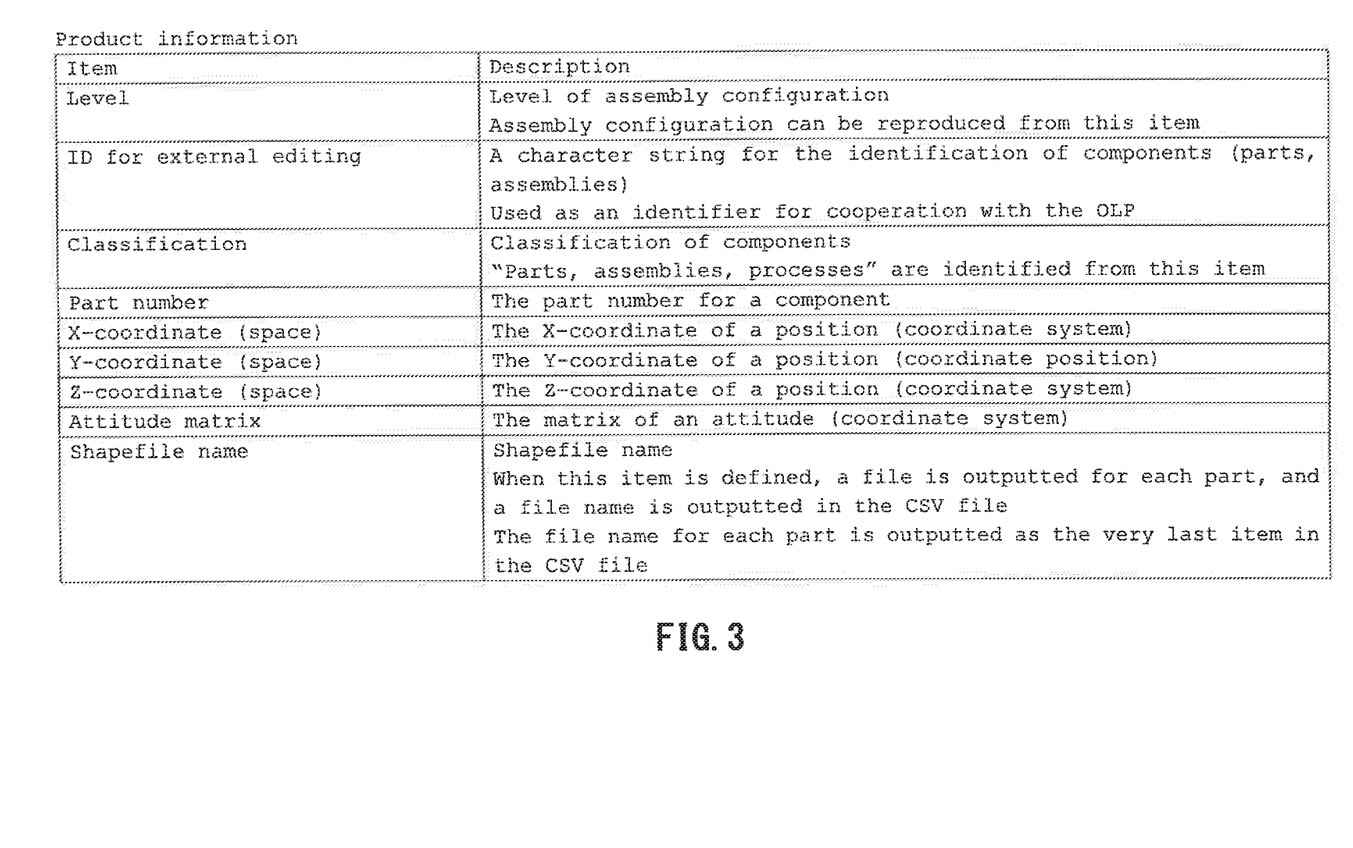
FIG. 3 is an explanatory diagram explaining the product information with the robot control program generation method in accordance with an embodiment of the present invention.
Figure 4:
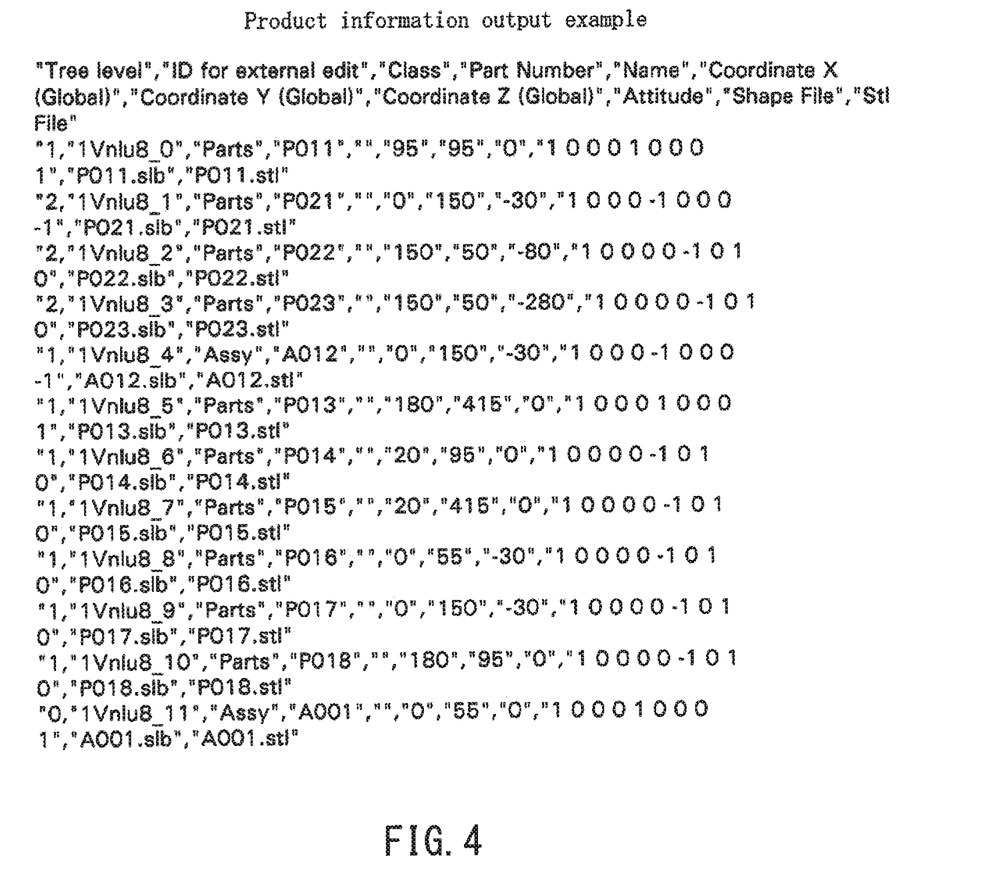
FIG. 4 illustrates an example of product information output with the robot control program generation method in accordance with an embodiment of the present invention.

As illustrated in FIG. 3, product information includes level, ID for external editing, classification, part number, X-coordinate (space), Y-coordinate (space), Z-coordinate (space), attitude matrix, shapefile name, etc. FIG. 4, illustrates an example of product information output.

Figure 6:
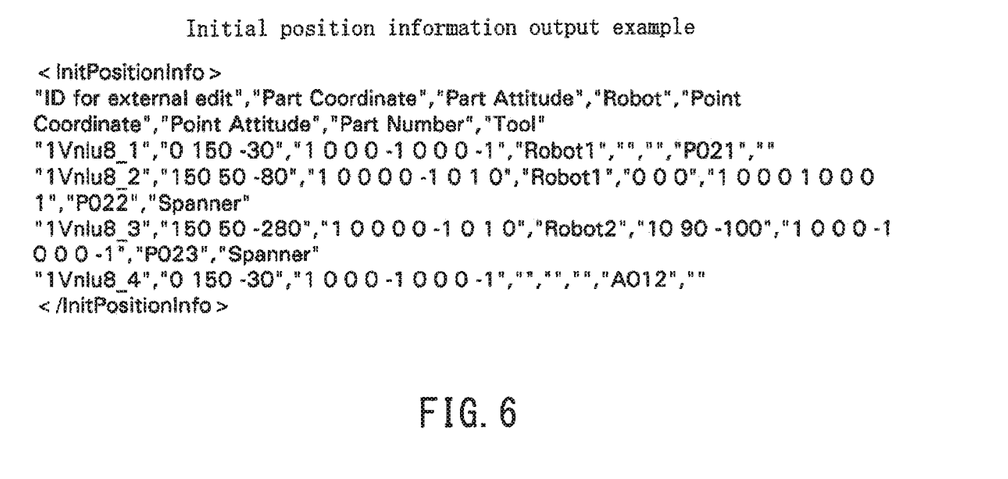
FIG. 6 illustrates an example of initial position information output with the robot control program generation method in accordance with an embodiment of the present invention.

As illustrated in FIG. 5, animated initial position and attitude information of the trajectory information output includes the following information about each of the plurality of parts used to make a product: ID for external editing, initial position coordinates, initial attitude matrix, subject robot name, teaching point position coordinates, teaching point attitude matrix, component number, instrument name, etc. FIG. 6, illustrates an example initial position information output.

Figure 7:
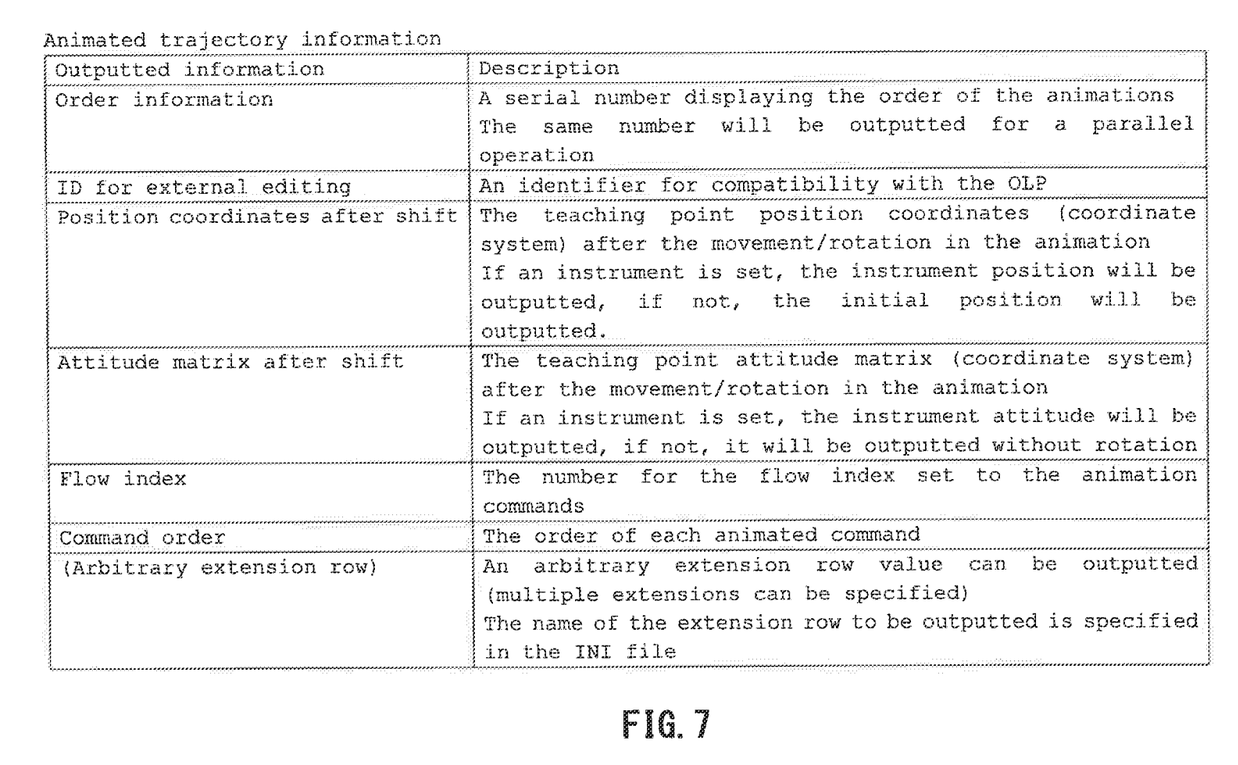
FIG. 7 is an explanatory diagram explaining animated trajectory information with the robot control program generation method in accordance with an embodiment of the present invention.
Figure 8:
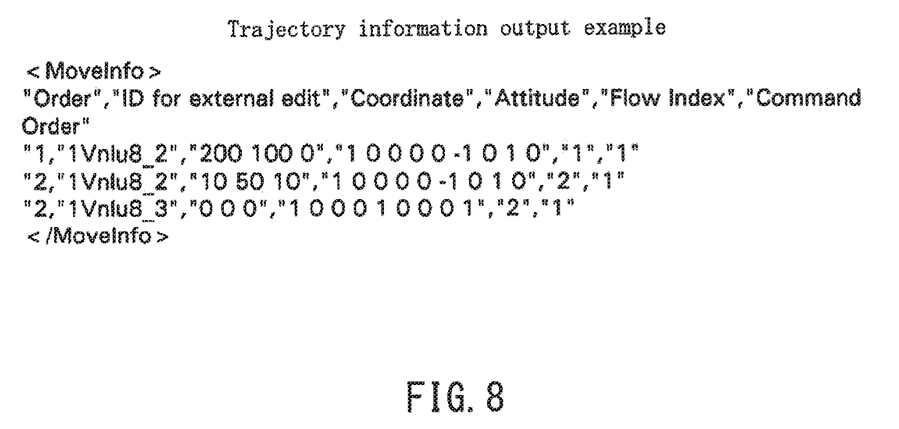
FIG. 8 illustrates an example of trajectory information output with the robot control program generation method in accordance with an embodiment of the present invention.

As illustrated in FIG. 7, animated trajectory information of the trajectory information output includes the following information about each of the plurality of parts used to make a product: order information, ID for external editing, position coordinates after shift, attitude matrix after shift, flow index, command order, etc. FIG. 8 illustrates an example of trajectory information output.

As illustrated in FIG. 1, the product information file 7, outputted from the animation program 2 in CSV format in the data extraction process, is converted to a robot-language product information file 11 through a robot language conversion process 10, and is saved as product information in the OLP 6. The shapefile 8, outputted from the animation program 2 in the data extraction process, is also saved as product information 12 in the OLP 6.

On the other hand, the trajectory information file 9, outputted from the animation program 2 in TXT format in the data extraction process, is converted to a robot-language trajectory information file 14 through a robot language conversion process 13, and saved as trajectory information 15 in the OLP 6.

Next, predetermined robot control data 16, that is not covered by the data extracted in the data extraction process, is added to the robot control program creation data (product information 12, trajectory information 15) extracted in the data extraction process, using data addition unit (data addition process).

Namely, because the animation program 2 is used to teach assembly sequences to operators, data regarding robot position/attitude etc, is not included therein. Then, robot control data 16 that cannot be acquired from the animation program is added in the data addition process.

The following can be added as the predetermined robot control data 16 in the data addition process.

Robot position/attitude (XYZOAT)
Robot speed (tip speed, axis speed)
Robot accuracy
Robot tool operation control
Branching process for abnormal conditions
Interlock signal information Then, by using the program creation unit, a robot control program 17 is created using robot control program creation data (product information 12, trajectory information 15) extracted in the data extraction process, and robot control data 16 added in the data addition process (program creation process). The robot control program 17 created in the program creation process is used to control a robot 18 to assemble products.

Note that in the OLP 6, it is preferable to use a robot simulator. Simulation data regarding assembly work can be created with the robot simulator using data from the animation program 2. The simulation data can then be applied to the robot (real) 18.

As stated above, according to the robot control program generation method and the apparatus 1 in accordance with the present embodiment, the robot control program 17 is generated using animated assembly data from the animation program 2 created to teach operators. Therefore, a robot control program 17 for the assembly of a predetermined product (assembled product) can be created easily and quickly.

For example, in the case that an operator's assembly work is being substituted with the robot 18, there is often already existing animated assembly data to teach the operator the assembly operations, so that a robot control program 17 relating to assembly work can be created easily and quickly using this data.

Further, there is a strong demand for the facilitation of robot 18 teaching operations in manufacturing lines that employ both operators and robots 18 for assembly work. As stated above, according to the robot control program generation method and the apparatus 1 in accordance with the present embodiment, a robot control program 17 relating to assembly operations can be created easily and quickly using animated assembly data from the animation program 2.

Further, in manufacturing lines that employ both operators and robots, the same assembly operations are taught to both the operators and the robots. In this case, there is often already existing animated assembly data to teach the operator assembly operations, so that a robot control program 17 relating to assembly operations can be created easily and quickly using this data.

Especially in cases where assembly operations have been modified due to a change of model of product (assembled product), an animation regarding the new assembly operations is created to teach the operators. Using the data from this assembly animation, a robot control program 17 relating to the new assembly operations can be created easily and quickly.

Note that, as conventional examples, there are also cases where a robot control program is created using a three-dimensional CAD program. The information included in the three-dimensional CAD program relates to the shape of the parts used for assembling a product (assembled product), etc. Information regarding the trajectory of each individual part (from where to where the part will be moved) cannot be obtained from this program.

In contrast, assembly animations are used to teach an assembly sequence to operators, so that information regarding the trajectory of each individual part is inherently included.

The present invention makes it possible, through the use of an animation program that includes such useful information inherently, to perform the easy and quick generation of a robot control program relating to assembly operations.

DESCRIPTION OF REFERENCE NUMERALS

1 . . . robot control program generation apparatus
2 . . . animation program
3 . . . animation program product information
4 . . . animation program trajectory information
5 . . . animation program other information
6 . . . offline program (OLP) for robots
7 . . . product information file
8 . . . shapefile
9 . . . trajectory information file
10, 13 . . . robot language conversion process
11 . . . product information file
12 . . . OLP product information
14 . . . trajectory information file
15 . . . OLP trajectory file
16 . . . additional predetermined robot control data
17 . . . robot control program
18 . . . robot

The invention claimed is:

1. A computer-implemented method for robot control program generation comprising:
   a data extraction step of extracting a robot control program creation data from a data of an existing animation program displaying an assembly sequence for manufacturing an assembled product by assembling a plurality of parts, the animation program providing guidance to teach an operator the assembly sequence for assembling the assembled product;
   a data addition step of adding a predetermined robot control data to the robot control program creation data extracted in the data extraction step;
   a program creation step of creating a robot control program relating to an assembly operation of the assembled product, using the robot control program creation data extracted in the data extraction step, and the predetermined robot control data added in the data addition step; and
   an outputting step to output the robot control program to a robot,
   wherein the robot control program creation data which is extracted in the data extraction step includes at least product information relating to the assembled product, and trajectory information relating to a trajectory of the plurality of parts at a time of assembly,
   wherein a file of the product information of the assembled product is outputted from data of the existing animation program in comma-separated values file (CSV) format, and is converted to a file of robot-language product information through a robot language conversion process, and
   wherein a file of the trajectory information is outputted from the data of the existing animation program in text file (TXT) format, and is converted to a file of robot-language trajectory information through a robot language conversion process.

2. The computer-implemented method according to claim 1, wherein the trajectory information includes at least animation initial position and attitude information relating to an initial position and an attitude of each of the plurality of parts, and animation trajectory information relating to the trajectory of each of the plurality of parts from the initial position.

3. The computer-implemented method according to claim 2, wherein the robot control program is created using a robot simulator in the program creation step.

4. The computer-implemented method according to claim 1, wherein the robot control program is created using a robot simulator in the program creation step.

5. A robot control program generation apparatus comprising:
   a central processing unit that is configured to function as:
   a data extraction unit that extracts a robot control program creation data from a data of an existing animation program displaying an assembly sequence for manufacturing an assembled product by assembling a plurality of parts, the animation program providing guidance to teach an operator the assembly sequence for assembling the assembled product;

a data addition unit that adds a predetermined robot control data to the robot control program creation data extracted by the data extraction unit;

a program creation unit that creates a robot control program relating to an assembly operation of the assembled product, using the robot control program creation data extracted by the data extraction unit, and the predetermined robot control data added by the data addition unit; and an output unit that outputs the robot control program to a robot, wherein the robot control program creation data which is extracted by the data extraction unit includes at least product information of the assembled product, and trajectory information relating to a trajectory of the plurality of parts at a time of assembly, wherein a file of the product information of the assembled product is outputted from data of the existing animation program in comma-separated values file (CSV) format, and is converted to a file of robot-language product information through a robot language conversion process, and wherein a file of the trajectory information is outputted from the data of the existing animation program in text file (TXT) format, and is converted to a file of robot-language trajectory information through a robot language conversion process.

6. The robot control program generation apparatus according to claim 5, wherein the trajectory information includes at least animation initial position and attitude information relating to an initial position and an attitude of each of the plurality of parts, and animation trajectory information relating to a trajectory of each of the plurality of parts from the initial position.

7. The robot control program generation apparatus according to claim 6, wherein the program creation unit includes a robot simulator.

8. The robot control program generation apparatus according to claim 5, wherein the program creation unit includes a robot simulator.

9. A non-transitory computer-readable medium embedded with a robot control program which, when being executed on a computer, enables the computer to function as:

a data extraction unit that extracts a robot control program creation data from a data of an existing animation program displaying an assembly sequence for manufacturing an assembled product by assembling a plurality of parts, the animation program providing guidance to teach an operator the assembly sequence for assembling the assembled product;

a data addition unit that adds a predetermined robot control data to the robot control program creation data extracted by the data extraction unit;

a program creation unit that creates a robot control program relating to an assembly operation of the assembled product, using the robot control program creation data extracted by the data extraction unit, and the predetermined robot control data added by the data addition unit; and an output unit that outputs the robot control program to a robot, wherein the robot control program creation data which is extracted by the data extraction unit includes at least product information of the assembled product, and trajectory information relating to a trajectory of the plurality of parts at a time of assembly, wherein a file of the product information of the assembled product is outputted from data of the existing animation program in comma-separated values file (CSV) format, and is converted to a file of robot-language product information through a robot language conversion process, and wherein a file of the trajectory information is outputted from the data of the existing animation program in text file (TXT) format, and is converted to a file of robot-language trajectory information through a robot language conversion process.

10. The non-transitory computer-readable medium according to claim 9, wherein the trajectory information includes at least animation initial position and attitude information relating to an initial position and an attitude of each of the plurality of parts, and animation trajectory information relating to the trajectory of each of the plurality of parts from the initial position.

11. The non-transitory computer-readable medium according to claim 10, wherein the program creation unit includes a robot simulator.

12. The non-transitory computer-readable medium according to claim 9, wherein the program creation unit includes a robot simulator.

\* \* \* \* \*